United States Patent
Zeiler et al.

(10) Patent No.: US 12,283,986 B2
(45) Date of Patent: Apr. 22, 2025

(54) OPTICAL WAVEMETER

(71) Applicant: Keysight Technologies, Inc., Santa Rosa, CA (US)

(72) Inventors: Marcel Zeiler, Boeblingen (DE); Bernd Nebendahl, Ditzingen (DE)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 213 days.

(21) Appl. No.: 18/127,184

(22) Filed: Mar. 28, 2023

(65) Prior Publication Data

US 2023/0239046 A1    Jul. 27, 2023

Related U.S. Application Data

(63) Continuation-in-part of application No. 17/874,513, filed on Jul. 27, 2022, now Pat. No. 12,174,509, which is a continuation-in-part of application No. 16/943,056, filed on Jul. 30, 2020, now Pat. No. 11,536,610.

(60) Provisional application No. 62/928,704, filed on Oct. 31, 2019.

(51) Int. Cl.
*G02B 6/293*    (2006.01)
*H04B 10/079*    (2013.01)
*H04B 10/61*    (2013.01)

(52) U.S. Cl.
CPC ..... *H04B 10/07957* (2013.01); *G02B 6/2935* (2013.01); *G02B 6/29352* (2013.01); *H04B 10/07955* (2013.01); *H04B 10/614* (2013.01)

(58) Field of Classification Search
CPC .......................... G02B 6/2935; G02B 6/29352
See application file for complete search history.

(56) References Cited

U.S. PATENT DOCUMENTS

| | | |
|---|---|---|
| 6,781,741 B2 | 8/2004 | Uesaka |
| 6,823,094 B2 | 11/2004 | Goh et al. |
| 8,406,580 B2 | 3/2013 | Takada et al. |
| 9,104,085 B2 | 8/2015 | Wesstrom |
| 10,145,731 B2 | 12/2018 | Qian et al. |

(Continued)

FOREIGN PATENT DOCUMENTS

| | | |
|---|---|---|
| CN | 105826811 A | 8/2016 |
| CN | 106371261 A | 2/2017 |

(Continued)

OTHER PUBLICATIONS

English translation of CN105826811A, 8 pgs.

(Continued)

*Primary Examiner* — Charlie Y Peng (57) ABSTRACT

An apparatus for determining a wavelength and a power of an input signal is described. The apparatus comprises a memory which stores instructions, which when executed by the processor, cause the processor to: recover a first phase for a first Mach-Zehnder Interferometer MZI; recover a second phase for a second MZI; subtract the first phase from the second phase to provide a phase difference; determine an unwrapped phase difference as a function of wavelength; determine a coarse wavelength; and determine a first wavelength for the first FSR and a second wavelength from the second FSR; and average the first and second wavelengths to determine the wavelength of the input signal.

20 Claims, 7 Drawing Sheets

(56) References Cited

U.S. PATENT DOCUMENTS

| | | | |
|---|---|---|---|
| 2003/0021304 A1 | | 1/2003 | Pezeshki et al. |
| 2010/0119189 A1* | | 5/2010 | Nasu ............... H04B 10/676 |
| | | | 385/11 |
| 2020/0158506 A1* | | 5/2020 | Rochus ............. G01C 19/662 |
| 2021/0131873 A1 | | 5/2021 | Zeiler et al. |
| 2023/0062578 A1* | | 3/2023 | Mahmoud .......... G02B 6/29385 |

FOREIGN PATENT DOCUMENTS

| | | | |
|---|---|---|---|
| CN | 118310439 A | * | 7/2024 |
| JP | H08251105 A | | 9/1996 |
| WO | 03063515 A2 | | 7/2003 |
| WO | 2017201548 A1 | | 11/2017 |

OTHER PUBLICATIONS

English translation of CN106371261A, 14 pgs.

Fabio Pavanello et al. "Broadband Digital Fourier Transform Spectrometer for On-Chip Wavelength Monitoring in the 2.3-μm Wavelength Range," IEEE Photonics Journal, vol. 11, No. 3, Jun. 2019, pp. 1-10.

Derek M. Kita et al., "High-performance and scalable on-chip digital Fourier transform spectroscopy," Nature Communications, 2018, DOI: 10.1038/s41467-018-06773-2 | www.nature.com/naturecommunications, pp. 1-7.

R. M. Oldenbeuving et al., "High precision wavelength estimation method for integrated optics," Optical Society of America, 2013, vol. 21, No. 14, DOI:10.1364/OE.21.017042, pp. 17042-17052.

Chao Xiang et al., Integrated chip-scale Si3N4 wavemeter with narrow free spectral range and high stability, Optic Letters, vol. 41, No. 14, Jul. 15, 2016, pp. 3309-3312.

Przemek J. Bock et al.,"Subwavelength grating Fourier-transform interferometer array in silicon-on-insulator," Laser Photonics Rev. 7, No. 6, L67-L70 (2013) / DOI 10.1002/lpor.201300063, pp. 67-70.

Babak Momeni et al., "Planar photonic crystal microspectrometers insilicon-nitride for the visible range," Optics Express, Sep. 14, 2009, vol. 17, No. 19, pp. 17060-17069.

"Keysight 86120D and 86122C Multi-Wavelength Meters—Data Sheet," Keysight Technologies, Dec. 1, 2016, pp. 1-8.

M. Muneeb et al., "Demonstration of Silicon-on-insulator midinfrared spectrometers operating at 3.8μm," Optics Express, May 20, 2013, vol. 21, No. 10, pp. 11659-11669.

"Tunable Laser Platform," Luna, Dec. 13, 2017, http://lunainc.com/phoenix, pp. 1-2.

S. N. Zheng et al., "On-chip Spectrometer Enhanced by Ring Resonator Cavity: High-resolution and Large-bandwidth," CLEO 2017 © OSA 2017, pp. 1-2.

Non-Final Office Action dated Jul. 8, 2022 for U.S. Appl. No. 16/943,056, 16 pgs.

Notice of Allowance dated Sep. 1, 2022 for U.S. Appl. No. 16/943,056, 8 pgs.

* cited by examiner

OPTICAL WAVEMETER

CROSS-REFERENCE TO RELATED APPLICATIONS

The present application is a continuation-in-part under 37 C.F.R § 1.53(b) of U.S. patent application Ser. No. 17/874,513 filed on Jul. 27, 2022. Priority is claimed under 35 U.S.C. § 120 from U.S. patent application Ser. No. 17/874,513, which claims priority under 35 U.S.C. § 120 from U.S. patent application Ser. No. 16/943,056 (now U.S. Pat. No. 11,536,610) and under 35 U.S.C. § 119(e) from U.S. Provisional Application 62/928,704. The entire disclosures of U.S. Pat. No. 11,536,610, U.S. patent application Ser. No. 17/874,513 and U.S. Provisional Application 62/928,704 are specifically incorporated herein by reference.

BACKGROUND

Knowing the wavelength of an optical signal is important when analyzing a signal of an unknown optical source, but also when the output of a (tunable) laser source must be conditioned according to pre-defined parameters, e.g. the wavelength.

Optical wavemeters allow the measurement of a wavelength of an optical source, often a narrowband optical source such as a laser. These optical wavemeters have practical applications such as continuous or continual monitoring of the wavelength of an optical source. Additionally, optical wavemeters have application in optical spectrum analyzers or wavelength-meters to provide a way to measure the wavelength of a reference signal and thus increase the accuracy of the actual measurement.

Many known wavemeters are based on bulk optical components disposed on a benchtop. Such benchtop devices are comparatively expensive, require an undesirable amount of space for implementation, and have a comparatively limited update rate.

While photonic integrated circuits (PICs) have been leveraged for various types of optical measurements, known devices have certain drawbacks that encumber their use. For example, while certain known PIC wavemeter-designs can be used for applications that do not require wavelength measurements at multiple wavelengths, the usable wavelength range of these known devices is comparatively short. As a result, certain known PIC wavemeters are not suitable to cover the wavelength range of many known desired applications, such as an optical communications wavelength band, which covers wavelengths, for example, from 1250 nm to 1650 nm. In addition, in certain known devices, the physical length of the waveguides required result in optical power losses that are unacceptable in many applications, such as the measurement of comparatively low-power optical signals.

Certain known optical wavemeters are practically limited to sources with a polarization maintaining fiber.

Moreover, an undesired accuracy penalty exists in certain known wavemeters that stems from the unavoidable birefringence in the photonic integrated waveguides.

What is needed, therefore, is an optical wavemeter that overcomes at least the shortcomings of known optical wavemeters discussed above.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element (e.g., an optical waveguide) is said to be connected to a second element (e.g., another optical waveguide), this encompasses cases where one or more intermediate elements or intervening devices may be employed to connect the two elements to each other. However, when a first element is said to be directly connected to a second element, this encompasses only cases where the two elements are connected to each other without any intermediate or intervening devices. Similarly, when a signal is said to be coupled to an element, this encompasses cases where one or more intermediate elements may be employed to couple the signal to the element. However, when a signal is said to be directly coupled to an element, this encompasses only cases where the signal is directly coupled to the element without any intermediate or intervening devices.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements" relationships to one another, as illustrated in the accompanying drawings. These relative terms are intended to encompass different orientations of the elements thereof in addition to the orientation depicted in the drawings. For example, if an apparatus (e.g., an optical wavemeter) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

Various embodiments of an optical wavemeter are described herein. The various embodiments are illustratively contemplated to be implemented as photonic integrated circuits (PICs). The PIC optical wavemeter of the representative embodiments is more stable than a bulk-optic solution when exposed to environmental factors such as temperature-changes, changes in ambient pressure or composition of the media between the bulk-optical elements, shock, and vibration because the optical signals traversing the optical wavemeter are guided within the chip rather than through several bulk-optic components. By contrast, bulk optical elements could, for example, move with respect to each other when the bulk optical wavemeter is dropped. Alternatively, the refractive index of air and the bulk-optic components might change differently when temperature changes and have an unpredictable impact on the free spectral range (FSR) of the MZI in which they are disposed. While certain known optical wavemeters are limited in practice to sources with polarization maintaining fiber output, the various optical wavemeters of the representative embodiments beneficially include optical signal processing that contemplates measurement of optical signals delivered in standard single mode fiber without the accuracy penalty that stems from the unavoidable birefringence in certain known photonic integrated waveguides. Notably processing optical signals under test delivered in a single mode fiber according to the present teachings is carried out by splitting the polarization into two orthogonal polarization states, either on-chip (PIC) or off-chip. One polarization can then be rotated to be in the same state as the other polarization and then being processing by the wavemeter in parallel to the other polarization. Beneficially, this approach avoids the loss of optical power of up to 3 dB due to an incorrect polarization state coupled into the wavemeter. Consequently, the optical power of the signal under test can be measured more accurately.

In accordance with a representative embodiment, an apparatus for determining a wavelength and a power of an input signal is disclosed. The apparatus comprises: a first optical splitter adapted split power of the input optical signal into a first output optical signal and a second output optical signal; a second optical splitter connected to a first arm of the first optical splitter, and adapted to split the first output optical signal into a third output optical signal and a fourth optical signal; a third optical splitter connected to a second arm of the first optical splitter, and adapted to split the second output optical signal into a fifth output optical signal and a sixth optical signal; a first Mach-Zehnder Interferometer (MZI) having a first free spectral range (FSR); a second Mach-Zehnder Interferometer (MZI) having a second FSR. The first MZI has a first optical path length (OPL) difference, and the second MZI has a second optical path length (OPL) difference, which is greater than the first OPL difference. The apparatus a processor; and a memory which stores instructions, which when executed by the processor, cause the processor to: recover a first phase for the first MZI; recover a second phase for the second MZI; subtract the first phase from the second phase to provide a phase difference; determine an unwrapped phase difference as a function of wavelength; determine a coarse wavelength; determining a first wavelength for the first MZI and a second wavelength from the second MZI; and average the first and second wavelengths to determine the wavelength of the input signal.

In accordance with another representative embodiment, a tangible, non-transitory computer readable medium that stores instructions is disclosed. The instructions, when executed by a processor, cause the processor to: recover a first phase for a first Mach-Zehnder Interferometer (MZI); recover a second phase for a second MZI; subtract the first phase from the second phase to provide a phase difference; determine an unwrapped phase difference as a function of wavelength; determine a coarse wavelength; determine a first wavelength for the first phase and a second wavelength from the second phase; and average the first and second wavelengths to determine the wavelength of the input signal.

Figure 1:
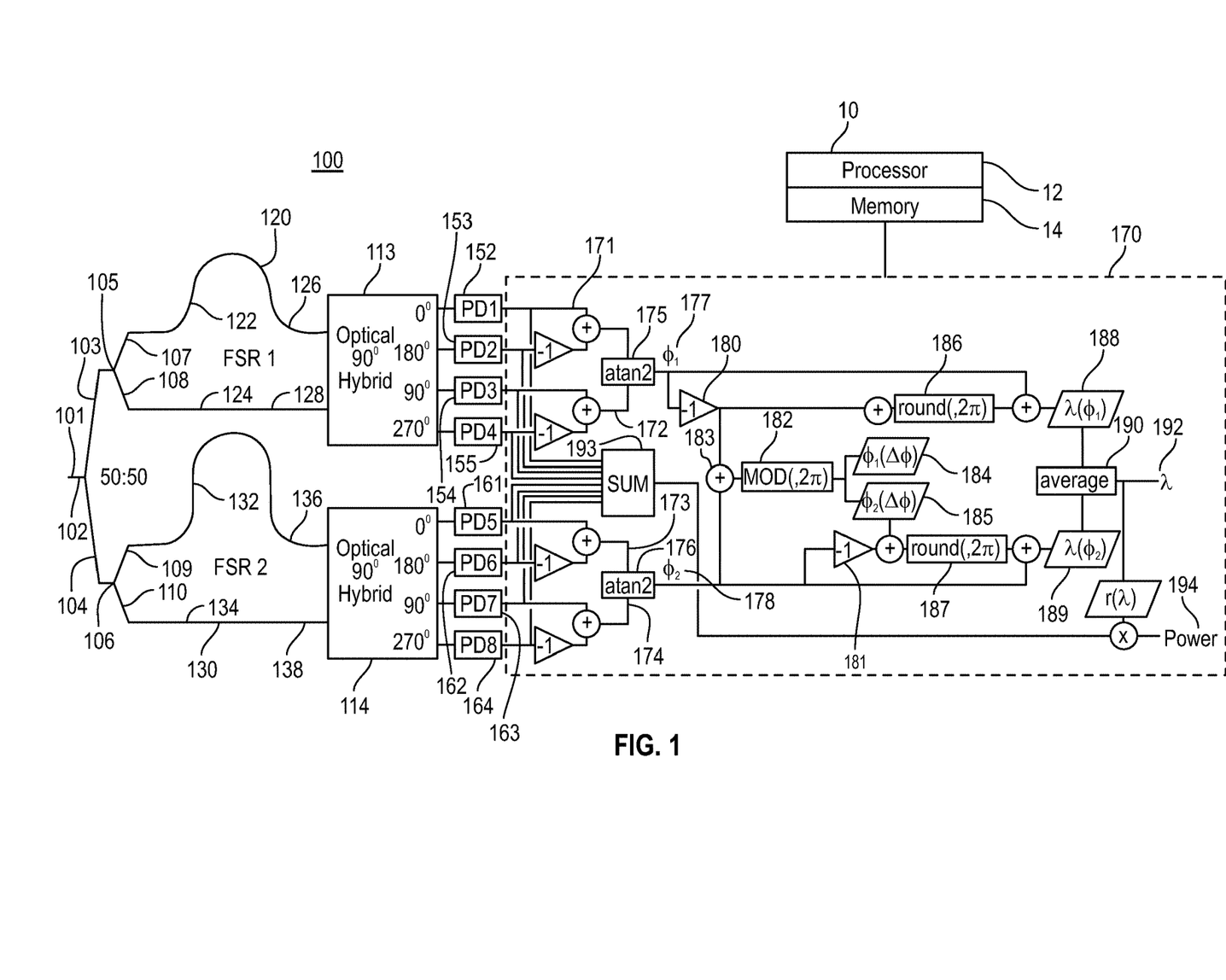
FIG. 1 is a simplified schematic diagram of an optical wavemeter comprising an optical hybrid in accordance with a representative embodiment.

FIG. 1 is a simplified schematic diagram of an optical wavemeter 100, in accordance with a representative embodiment. Notably, the optical wavemeter 100 is contemplated for instantiation as a photonic integrated circuit (PIC) such as described in the above-incorporated patent documents.

An input optical signal 101 is provided to first optical splitter 102 that is adapted to split the of the input optical signal 101 into a first optical signal 103 and a second optical signal 104, having equal power. As such, the first optical splitter is a 50:50 optical splitter.

The first optical signal 103 is then incident on a second optical splitter 105, and the second optical signal 104 is incident on a third optical splitter 106. Like the first optical splitter 102, the second and third optical splitters 105, 106 are each 50:50 splitters, and as such, the input optical signal is again equally split by the second and third optical splitters 105, 106. The second optical splitter 105 provides a first output optical signal 107 and a second output optical signal 108. Similarly, the third optical splitter 106 provides a third output optical signal 109 and a fourth output optical signal 110. As will be appreciated, neglecting power loss in optical waveguides and couplers, each of the first, second, third and fourth optical output signals have one-fourth of the optical power of the input optical signal 101 provided to the input of the optical wavemeter 100.

The first output optical signal 107 is received at a first port of a first arm 122 of a first Mach-Zehnder interferometer (MZI) 120; and the second output optical signal 108 is received at a second port of a second arm 124 of the first MZI 120.

Similarly, the third output optical signal 109 is received at a first port of a first arm 132 of a second Mach-Zehnder interferometer (MZI) 130; and the fourth output optical signal 110 is received at a second port of a second arm 134 of the second MZI 130.

As described more fully in the above-incorporated patent documents, the FSRs of the first and second MZIs 120, 130 are realized by providing a first effective index of refraction for the first MZI 120, and a second effective index of refraction for the second MZI 130, which is not the same as the first effective index of refraction. In addition, or instead of the providing different effective indices of refraction, the first MZI 120 may have a first geometric optical length (i.e., physical length) and the second MZI 130 may have a second geometric optical length, which is different than the first geometric optical length. The selection of differing widths and/or height for the waveguides in each MZI are illustrative ways to provide different effective indices of refraction in each MZI, and as a result are ways to provide MZIs with different FSRs in a PIC. Alternatively, materials used for the core and cladding of the waveguides of respective MZIs can be selected to provide different effective indices of refraction for waveguides that form the MZI. For example, the core/cladding for the optical waveguides of representative embodiments can be combinations of silicon (Si), germanium (Ge), silicon dioxide ($SiO_2$), silicon nitride ($Si_3N_4$); or indium phosphide-based (InP). Notably, these materials can either be doped or undoped, or combinations of doped and undoped materials. These material systems are merely illustrative, and other materials systems may be incorporated without departing from the scope of the present teachings.

As described more fully below, the differing FSRs of the first and second MZI's 120, 130 are used to determine accurately a wavelength of the input optical signal 101 over a comparatively wide wavelength range.

It can be shown that the FSR of an MZI is given by:

$$FSR = \frac{\lambda^2}{2 * n_g \Delta L}$$

where $\lambda$, is the wavelength of the optical signal traversing the MZI, $n_g$ is the group effective index of refraction of the waveguides (at wavelength $\lambda$) of the first and second arms of the MZI, and $\Delta L$ is the difference in the geometric length of the optical waveguide in the first arm and the waveguide of the second arm of the MZI.

Desirably, it is useful to provide a wavemeter that can operate over a comparatively large wavelength range using MZIs. For an MZI to operate over a comparatively wide wavelength range, the FSR needs to be comparatively large. From the above relation, it is clear that a comparatively short optical path length difference is required. As such, because of the large FSR of the MZI, which comprises a comparatively flat slope, the accuracy of the wavelength measurement over a comparatively large wavelength range suffers from greater inaccuracy of the measurement. By contrast, a small FSR has a comparatively steep slope, and thereby is more accurate; but the resultant wavelength range of a wavemeter is comparatively small, albeit much more accurate. To resolve the trade-off between small FSR (high wavelength resolution and accuracy) and large FSR (large usable wavelength range), according to the present teachings, the first and second MZI's 120, 130 with different FSR's are measured and the difference of the recovered phase is calculated to provide an effective FSR over a comparatively wide wavelength range, and the individual FSR's of the first and second MZI's 120, 130 are then used to determine the wavelength of input optical signal 101 over a comparatively narrow wavelength range.

The first MZI 120 has a first free-spectral range (FSR), and the second MZI 130 has a second free spectral range, which is different than the first FSR of the first MZI 120. That is, the FSR of the first MZI 120 and the FSR of the second MZI 130 are not identical, but differ only slightly (e.g., differing by approximately 50 pm). Moreover, the FSR's of the first and second MZI's are comparatively small to ultimately provide a more accurate wavelength measurement, yet over a comparatively large wavelength range. By the present teachings, the slight differences in the FSRs of the first and second MZI's 120, 130 are used to provide a comparatively accurate wavelength measurement over a comparatively large wavelength range for the input optical signal 101. To this end, and as described more fully below, an effective FSR over a wide wavelength range is created by subtracting two FSRs. As such, the coarse wavelength determination is done by subtracting the two measured phase values and assigning the new value of a value in a look-up table covering the effective FSR range. As such, a first coarse wavelength determination is made by subtracting the phase of the first MZI 120 from the phase of the second MZI 130. Once this coarse wavelength is determined, the comparatively small FSR's of the first and second MZI's 120, 130 are used to provide a fine wavelength measurement yet over the comparatively large wavelength range, such as for example, 100 nm. Stated somewhat differently, and as described more fully below, the FSR's of the first and second MZI's 120, 130 are subtracted to provide an effective new FSR that having a comparatively large wavelength range. This new effective FSR is used to determine the coarse wavelength of the input optical signal 101. With the coarse wavelength determined, the narrow FSR values of the first and second MZI's 120, 130 having a comparatively steep slope are used to refine the coarse wavelength measurement to provide an accurate wavelength measurement of the input optical signal 101 over the comparatively large wavelength range afforded by the effectively new FSR. Measurement and calculation of the various data and parameters needed accurately to determine the wavelength of the input optical signal 101 is now described.

A first output 126 and a second output 128 are provided from the first and second arms 122, 124 of the first MZI 120 to first and second inputs of a first optical hybrid 113, which provides respective outputs to first through fourth photodetectors 152, 153, 154 and 155. The outputs (i.e., power levels) from the first~fourth photodetectors 152~155 are provided to a controller 10 comprising a processor 12 and a memory 14, the functions of which are described more fully below.

A first output 136 and a second output 138 are provided to a second optical hybrid 114 from first and second arms of the second MZI 130. The second optical hybrid 114 provides outputs to fifth, sixth, seventh and eighth photodetectors 162, 163, 164 and 165. The outputs (i.e., power levels) from the fifth~eighth photodetectors 162~165 are provided to the controller 10 comprising the processor 12 and the memory 14, the functions of which are described more fully below. It is noted that the use of eight photodetectors is merely illustrative and more or fewer photodetectors can be used to exact measurements of the same accuracy as is achieved using eight photodetectors. Notably, the accuracy of the measured wavelength of the input optical signal 101 according to the present teachings is realized by the process of calibration using the known wavelength source, and the fabrication of look-up tables that include phase value/wavelength pairs based on the known wavelength of the optical source, as described more fully below. Stated somewhat differently, according to a representative embodiment, in the lookup table a unique relationship exists between a wavelength and a phase.

According to various representative embodiments described herein, the controller 10 is adapted to determine a wavelength of the input optical signal 101 provided to the first optical splitter 102 of the optical wavemeter 100. As noted, the controller 180 comprises the processor 12, which is tangible and non-transitory, and is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 182 of the present teachings is an article of manufacture and/or a machine component. The processor 182 for the controller 180 is configured to execute software instructions to perform functions as described in the various embodiments herein. The processor 182 may be a general-purpose processor or may be part of an application specific integrated circuit (ASIC). The processor 182 may also be (or include) a microprocessor, a microcomputer, a processor chip, a controller, a microcontroller, a digital signal processor (DSP), a state machine, or a programmable logic device. The processor 182 may also be (or include) a logical circuit, including a programmable gate array (PGA) such as a field programmable gate array (FPGA), or another type of circuit that includes discrete gate and/or transistor logic. The processor 182 may be a central processing unit (CPU), a graphics processing unit (GPU), or both. Additionally, the processor 182 may comprise multiple processors, parallel processors, or both. Multiple processors may be included in, or coupled to, a single device or multiple devices.

The memory 14 may comprise a main memory or a static memory, or both, where the memories may communicate with each other via a bus (not shown). The memory 184 described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. As such, the present teachings also encompass a tangible, non-transitory computer readable medium that stores instructions that cause a processor or processing system to execute instructions/algorithms described herein. A non-transitory computer readable medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system.

The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As described more fully below, various functions of the optical wavemeter 100 are carried out by the execution of instructions stored in memory 14 by the processor 12. These instructions include various algorithms described in connection with an electrical signal processing section 170 of the optical wavemeter 100. As such, through the execution of algorithms stored in memory 14 and described in connection with the electrical signal processing section 170, the wavelength and power of the input optical signal 101 are determined with accuracy on the order of picometers or less and sub-milli-Watts.

As noted above, the first optical hybrid 113 receives first and second inputs 126, 128 and provides four outputs having phases 0°, 180°, 90°, and 270° relative to the input optical signal 101 as shown to the first~fourth photodetectors 152~155. Similarly, the second optical hybrid 114 receives first and second inputs 136, 138 and provides four outputs having phases 0°, 180°, 90°, and 270° relative to the input optical signal 101 as shown to the fifth~eighth photodetectors 162~165. It is emphasized that the phase relation of 90° of the first and second optical hybrids 113, 114 is merely illustrative, and optical hybrids having other phase relations are contemplated. Just by way of illustration, the first and second optical hybrids 113, 114 may have phase relation of 60° or 120°.

Figure 2A:
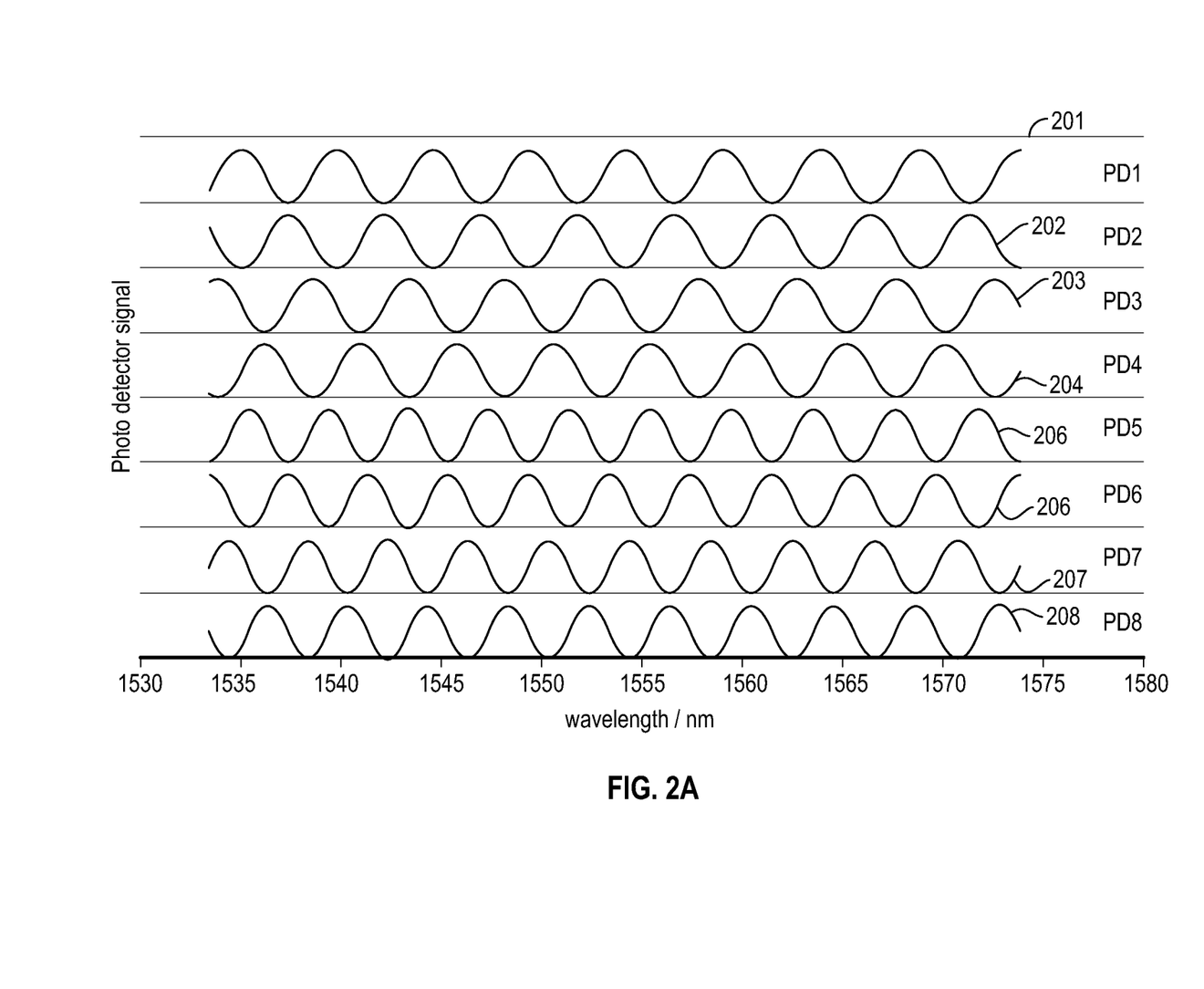
FIG. 2A is a graph of optical power versus wavelength from the plurality of photodetectors in accordance with a representative embodiment.

FIG. 2A shows the eight output signals from the first through eighth photodetectors 152~165. Specifically, a first curve 201 shows the output signal (photocurrent) from the first photodetector 151, a second curve 202 shows the output signal from the second photodetector 152, a third curve 203 shows the output signal (photocurrent) from the third photodetector 153 and a fourth curve 204 shows the output signal (photocurrent) from the fourth photodetector 155. Similarly, a fifth curve 205 shows the output signal (photocurrent) from the fifth photodetector 161, a sixth curve 206 shows the output signal (photocurrent) from the sixth photodetector 162, a seventh curve 207 shows the output signal (photocurrent) from the seventh photodetector 163 and an eighth curve 208 shows the output signal (photocurrent) from the eighth photodetector 164. The relative phase of each of the first~eighth curves 201~208 caused by the various elements of the first and second optical hybrids 113, 114 can be seen. As alluded to above, the first and second optical hybrids 113, 114 are contemplated as being implemented using PIC fabrication technology with the differences in optical path lengths (OPL's) that provides the relative phases of the output signals from the first and second optical hybrids 113, 114 being realized through the selection of the lengths, and/or the materials and dimensions of the optical waveguides that make up the first and second optical hybrids as described in the above-incorporated patent documents.

The output signals from the first and second photodetectors 151, 152 are subtracted at 171 via inversion and addition, and the output signals from the second and third photodetectors 153, 154 are subtracted at 172 via inversion and addition. Similarly, output signals from the fifth and sixth photodetectors 161, 162 are subtracted at 173 via inversion and addition, and the output signals from the seventh and eighth photodetectors 163, 164 are subtracted at 173 via inversion and addition at 174. As noted above, the subtraction of the output signals from the photodetectors is carried out by execution of instructions stored in the memory 14 by the processor.

Figure 2B:
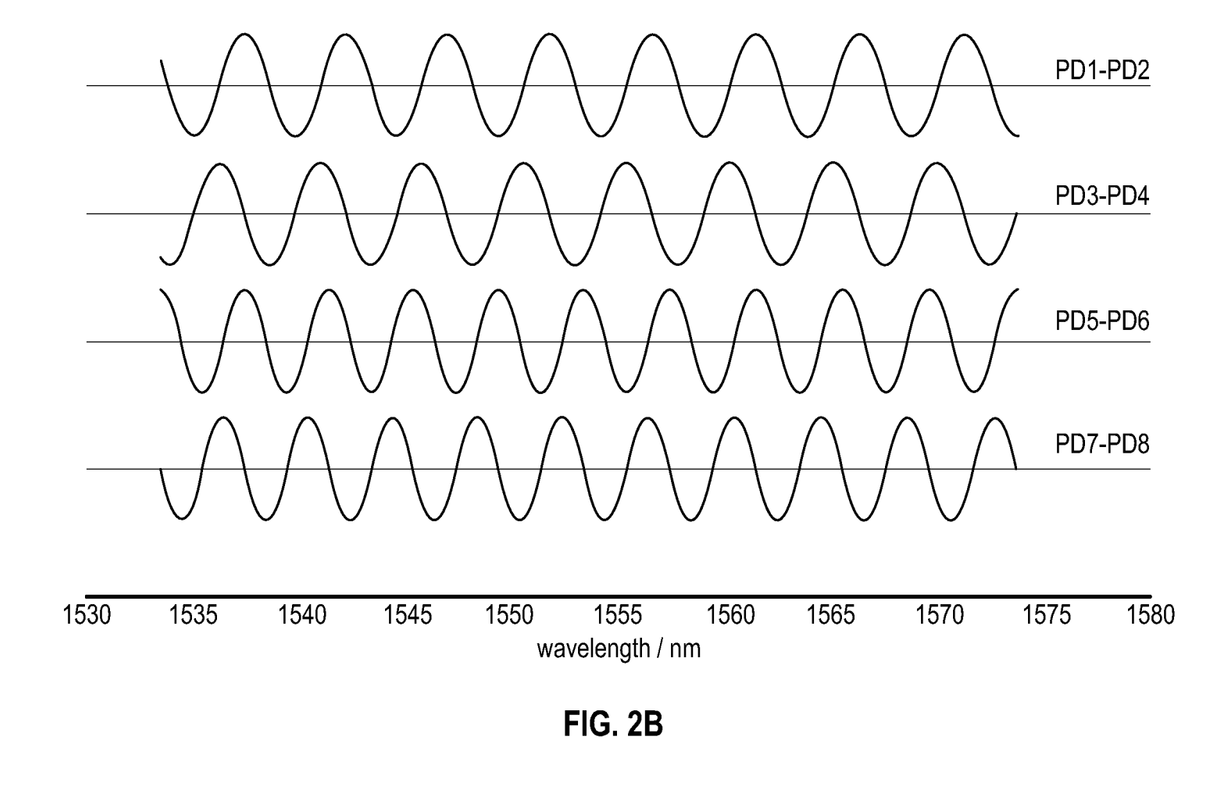
FIG. 2B is a graph of difference in optical power from pairs of the plurality of photodetectors in accordance with a representative embodiment.

FIG. 2B shows the difference signals realized at 171, 172, 174 and 174. Specifically, first difference signal 210 represents the magnitude and phase of the difference between first and second output signals 201, 202; second difference signal 212 represents the magnitude and phase of the difference between third and fourth output signals 203, 204; third difference signal 214 represents the magnitude and phase of the difference between fifth and sixth output signals 205, 206; and fourth difference signal 216 represents the magnitude and phase of the difference between seventh and eighth output signals 207, 208.

The determination of a first phase ($\varphi_1$) of the first MZI 120 and of a second phase ($\varphi_2$) of the second MZ1 130 is made at 175 and 176, respectively. As will be appreciated, a first phase ($\varphi_1$) of the first MZI 120 and of a second phase ($\varphi_2$) of the second MZ1 130 are determined by execution of instructions stored in memory 14 by the processor 12. Specifically, $\varphi_1$ is determined by taking the arctan of a difference between the first difference signal 210 and the second difference signal 212, and $\varphi_2$ is determined by taking the arctan of a difference between the third difference signal 214 and the fourth difference signal 216:

$$\varphi_1 = atan2(PD1-PD2, PD3-PD4)$$

$$\varphi_2 = atan2(PD5-PD6, PD7-PD8)$$

Figure 3A:
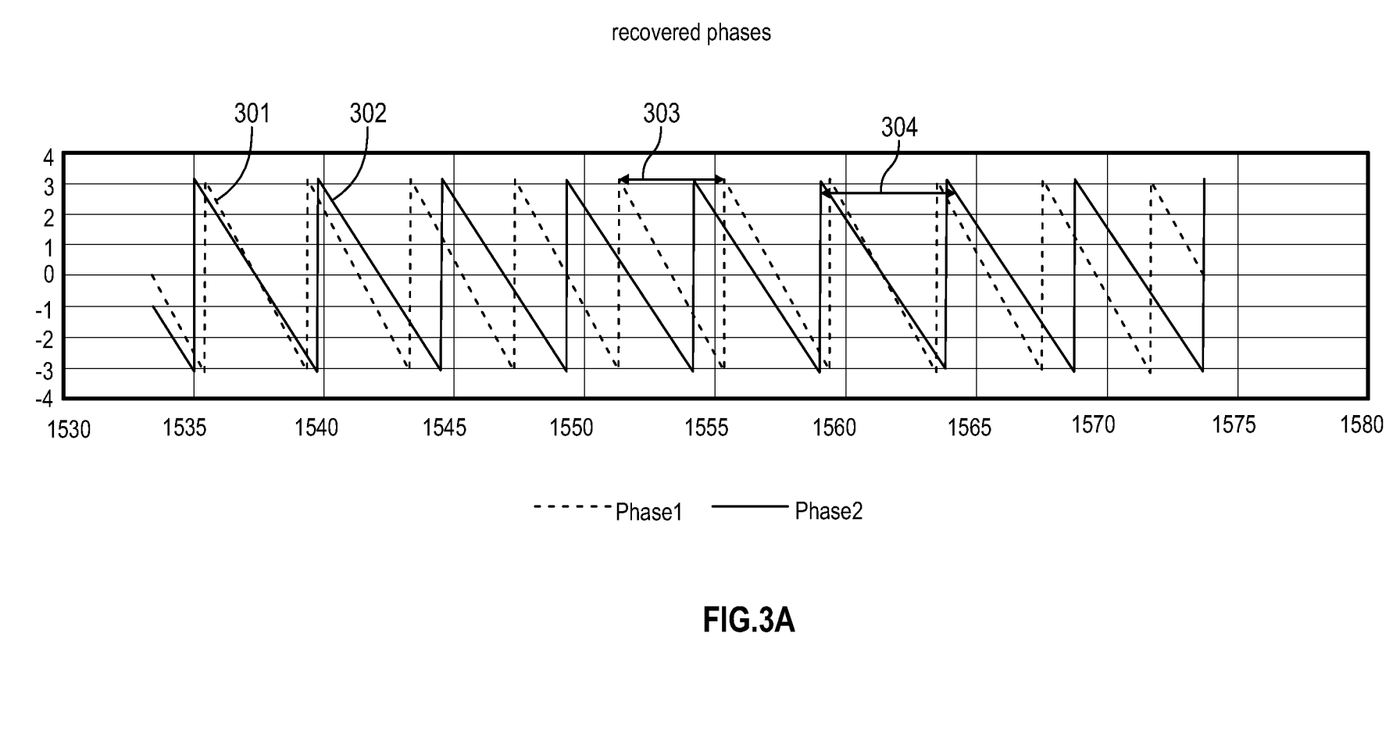
FIG. 3A is a graph of the recovered phases from the first and second MZI's in accordance with a representative embodiment.

FIG. 3A shows the recovered phase versus wavelength over a comparatively wide wavelength range. Specifically, the first phase $\varphi_1$ and the second phase $\varphi_2$ are shown at first curve 301 and second curve 302, versus wavelength, having been determined using the relations above. As described more fully below, the first curve 301 has a first FSR 303 for first phase $\varphi_1$ and the second curve 302 has a second FSR 304. The first phase $\varphi_1$ is shown at 177 and the second phase $\varphi_2$ is shown at 176 in FIG. 1.

As described more fully below, these phase versus wavelength data are compared to stored calibration data comprising phase versus wavelength for light sources having known wavelengths in a look-up table stored in the memory 14 to determine both the coarse wavelength and the fine wavelength of the input optical signal 101.

Figure 3B:
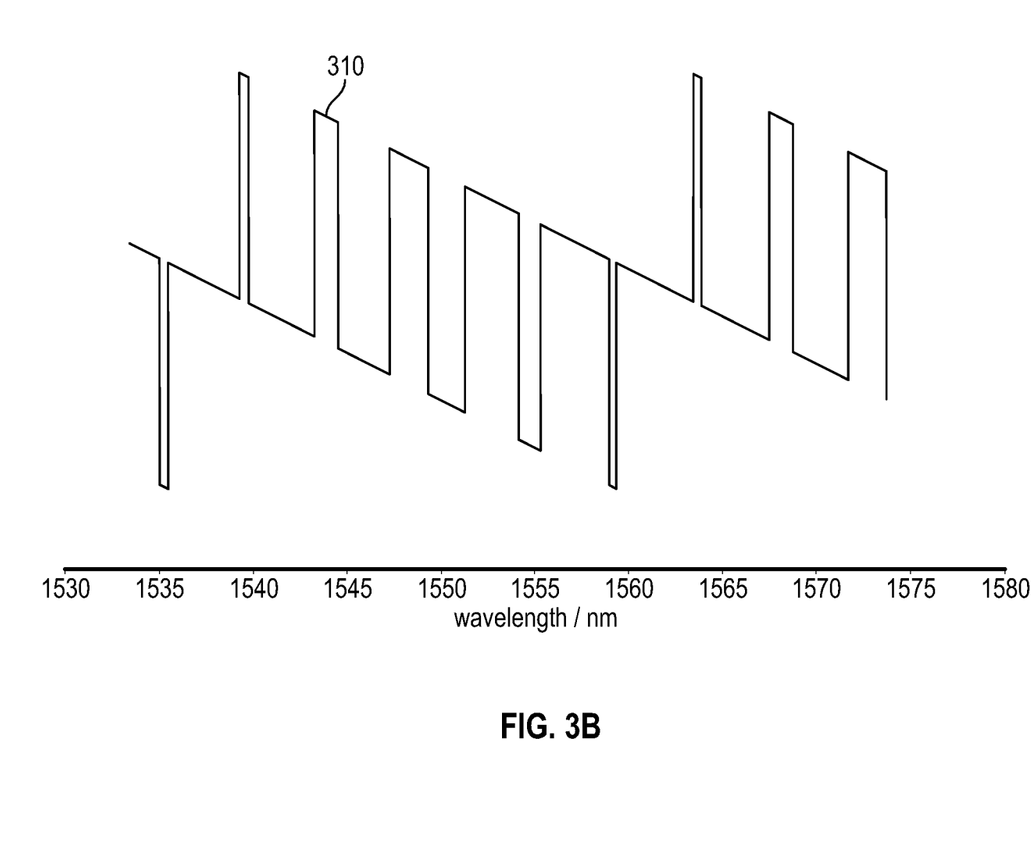
FIG. 3B is a graph of a difference between the recovered phases from the first and second MZI's versus wavelength in accordance with a representative embodiment.

FIG. 3B is a graph 310 of a difference between the recovered phases from the first and second MZI's versus wavelength in accordance with a representative embodiment.

As noted above, the present teachings provide an effective FSR by subtracting the FSR's of the first and second MZI's 120, 130. This effective FSR, which is useful in determining the coarse wavelength of the input optical signal 101 as described below. Graph 310 shows the phase difference ($\Delta\varphi$)=$\varphi_1-\varphi_2$. However, this subtraction leads to phase artifacts as shown, where the phase difference $\Delta\varphi$ becomes negative. As such, the phase wraps, and these data are not useful in determining the wavelength of the input signal. Notably, the ambiguity of the phase difference values, which comprise several wavelengths (x-values) for one phase (y-value) prevents the useful determination of the wavelength of the input optical signal 101. As such, the graph 310 of FIG. 3B includes the so-called wrapped phase as a function of wavelength.

Figure 3C:
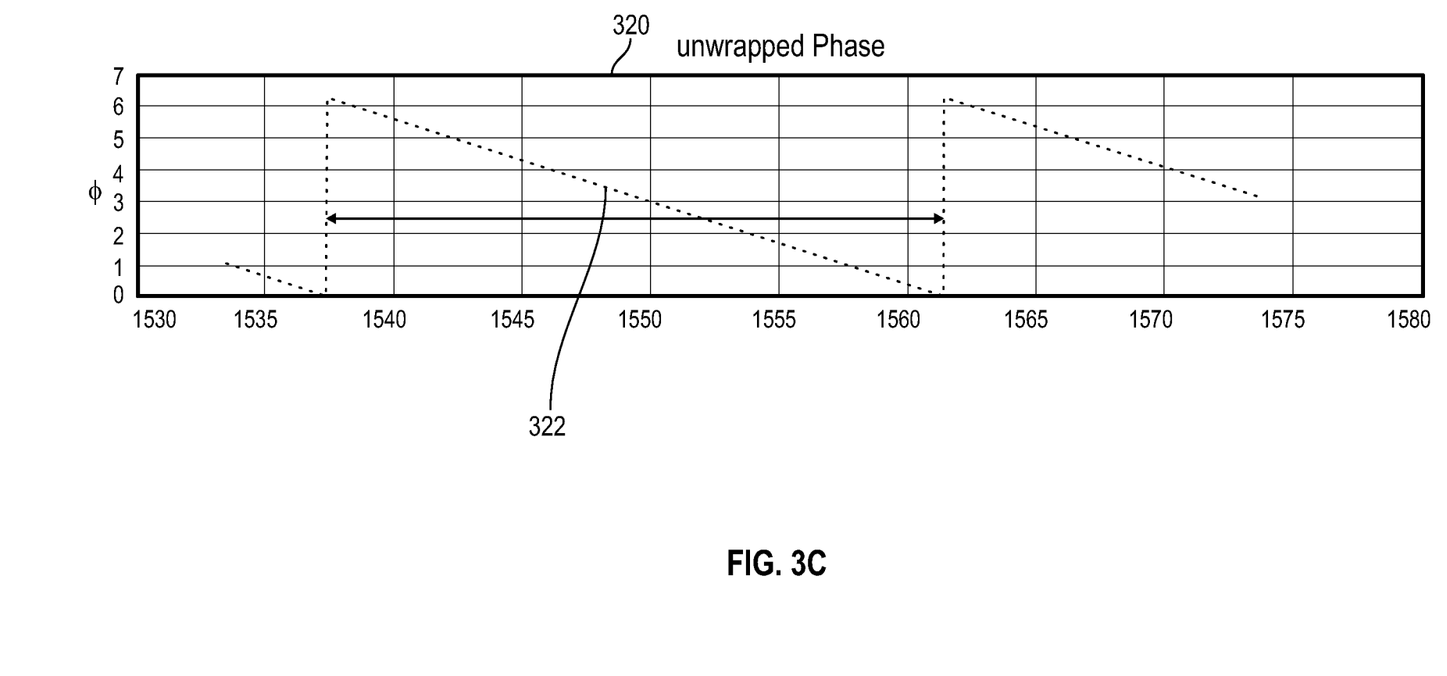
FIG. 3C is a graph of the unwrapped differences between the recovered phases from the first and second MZI's versus wavelength in accordance with a representative embodiment.

FIG. 3C shows the so-called unwrapped phase versus wavelength 320 according to a representative embodiment. The unwrapped phase versus wavelength 320 is realized by adding a phase of $2\pi$ to the phase difference to the data of FIG. 3B when the phase difference is negative. Again, the data for the unwrapped phase versus wavelength 320 are determined by execution of instructions stored in memory 14 by the processor 12. Specifically, at 180 $\varphi_1$ is inverted and $\varphi_2$ is added at 183 and the modulo function at 182 provides the phase. The resultant unwrapped phase versus wavelength 320, which is determined based on the FSR's of the first MZI 120 and the second MZI 130 provides the above-referenced effective FSR that has a comparatively wide useable wavelength range 322, which, as will be appreciated by one of ordinary skill in the art comprises one complete cycle of the unwrapped phase as a function of wavelength.

Just by way of illustration, at 182 and 183, a program/code stored in memory 14 executed by the processor 12 to carry out the determination of the coarse wavelength may be given by the following program:

If ($\varphi_1-\varphi_2$)<0 ($\varphi_1-\varphi_2$)=($\varphi_1-\varphi_2$)+$2\pi$Else ($\varphi_1-\varphi_2$)= ($\varphi_1-\varphi_2$)

Alternatively, the modulo operator may be used, and the program would be:

MOD(($\varphi_1-\varphi_2$),$2\pi$)

This too provides the unwrapped phase value with the coarse wavelengths being determined by the processor 12 from the look-up tables storing the calibration data stored at 184 or 185.

Stated somewhat differently, in executing the instructions stored in memory 14, the processor 12 provides the unwrapped phase versus wavelength, which is the difference between $\varphi_1$ and $\varphi_2$. Then the executed instructions cause the processor 12 to remove artifacts as discussed above in connection with FIG. 3B. As such, the instructions cause the processor 12 to determine the unwrapped phase value versus wavelength 320, which provides the effective FSR as shown in FIG. 3C. As alluded to above, the effective FSR shown in FIG. 3B has a comparatively wide range, which results in comparatively low resolution and thus accuracy. However, providing this effective FSR enables the determination of the coarse wavelength based on the values of $\varphi_1$ and $\varphi_2$. As described more fully below, the determination of the effective FSR as shown in FIG. 3C, and as described in connection with FIG. 3D, allows ambiguous or inaccurate portions of the first FSR of the first MZI 120 and the second FSR of the second MZI 130 to be ignored in favor of the correct portions of the first and second FSR's shown in FIG. 3A (and again below in connection with FIG. 3D) based on the coarse wavelength. This allows the selection of the correct portion of the first and second FSR's shown in FIG. 3A, and as described in connection with FIG. 3E, which have a comparatively steep slope and therefore can more accurately determine the wavelength.

Referring again to FIGS. 1 and 3C, the values of the wavelength and unwrapped phase values that cover the effective FSR for the wavelength range 322 are measured and stored in memory 14 as look-up tables at 184 and 185 as shown in FIG. 1 with the table at 184 comprising phase/wavelength pairs for the unwrapped phase values at each wavelength. That is, for the wavelength range 322, calibration data of unwrapped phase values/wavelength pairs for from optical sources having known wavelengths are stored in the look-up tables at 184 and 185. Accordingly, these calibration data provide the pairing of the unwrapped phase values of FIG. 3C at each wavelength across the wavelength range. As described more fully below, these unwrapped phase values/wavelength pairs of calibration data are used to determine the coarse wavelength for the phases of unknown input optical signal 101, and the more refined wavelength using the steeper slope FSR's of FIG. 3A.

Figure 3D:
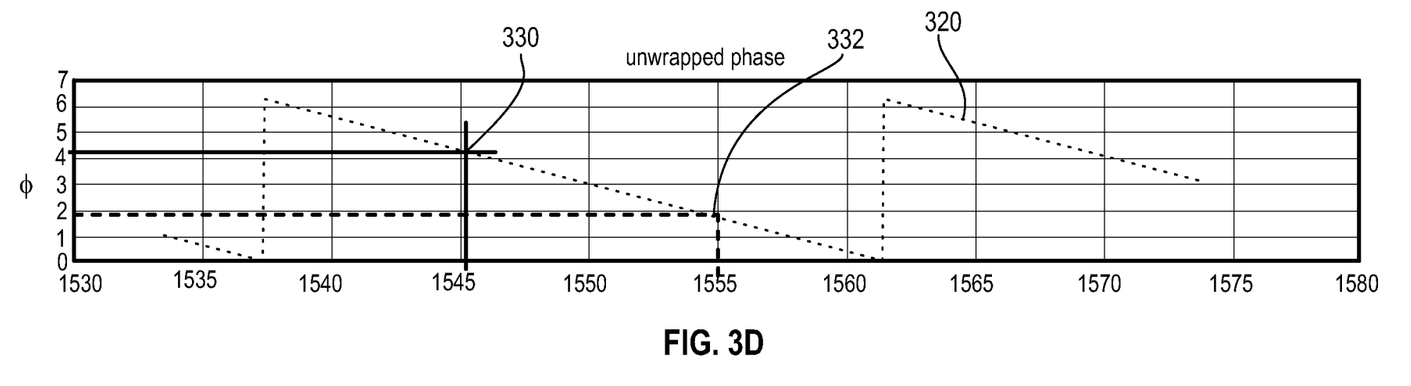
FIG. 3D shows coarse wavelengths determined from the unwrapped differences at two illustrative phase values.

FIG. 3D shows coarse wavelengths determined from the unwrapped phase values at two illustrative points based on the phase difference values $\Delta\varphi$ after the unwrapping (also referred to as the unwrapped phase values) is completed. Specifically, two illustrative measured unwrapped phase values 4.3 and 2.9 are shown. These values are measured using the optical wavemeter 100 described above. Based on the intersection of the y-axes phase value data, the unwrapped phase value of 4.3 corresponds to a wavelength of approximately 1545 nm. For the other data point, the unwrapped phase value of 2.9 corresponds to a wavelength of approximately 1555 nm. As such, based on these two phase value data points, and from the calibration data stored at 184 or 185, the phase value of 4.3 is determined by execution of instructions by the processor 12 to be 1545 nm, and the phase value of 2.9 is corresponds to a wavelength of approximately 1555 nm. Accordingly, based on the effective FSR of the unwrapped phase versus wavelength 320, coarse wavelengths of 1545 nm and 1555 nm are determined and thereby measured.

Figure 3E:
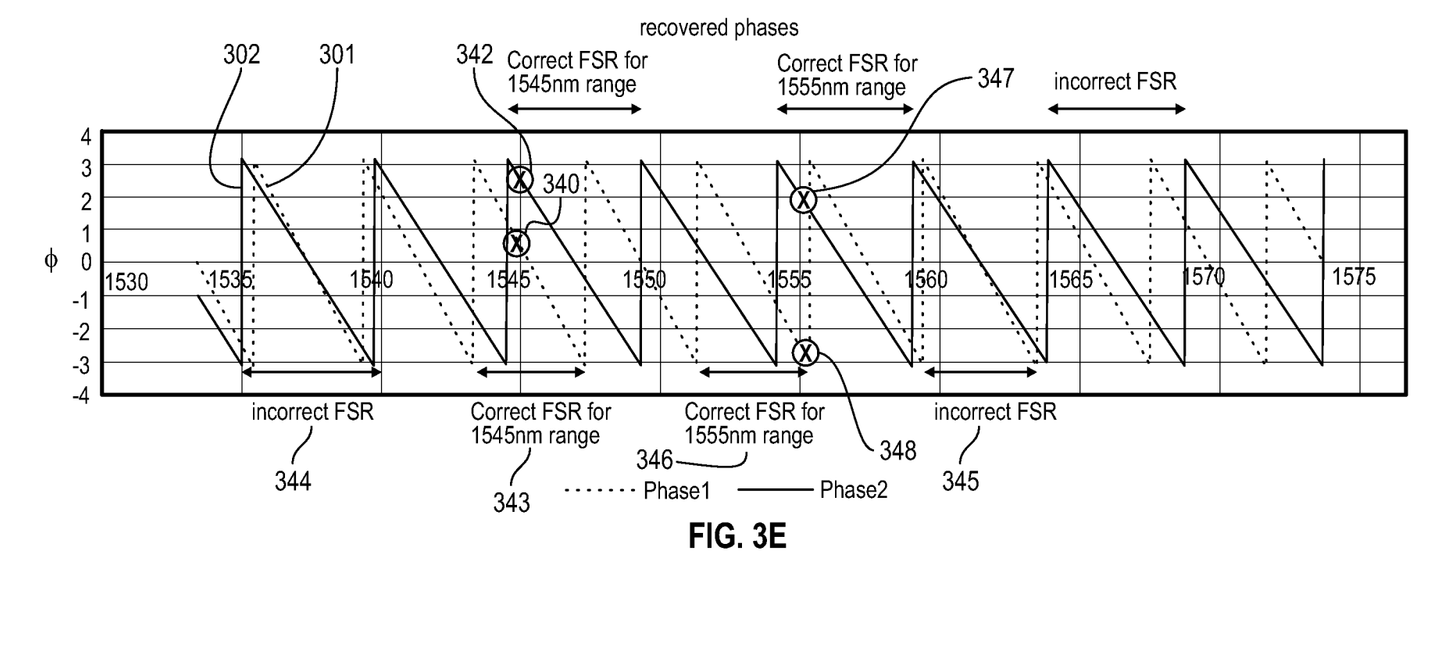
FIG. 3E is a graph showing the rounding used to determine the correct FSR for the two illustrative phases used to determine the more precise wavelength values.

FIG. 3E is a graph showing the rounding used to determine the correct FSR for the two illustrative phases used to determine the more precise wavelength values.

At 186 and 187 so-called rounding blocks are used to determine more accurately the wavelength of the input optical signal 101. Again, based on the two illustrative coarse wavelengths 1545 nm and 1555 nm, the processor 12 executes instructions at 186, 187 that isolate the correct portion of the first and second FSR's 301, 302 to determine the wavelength of the input signal more accurately. To this end, the first curve 301 (the first FSR) for the first phase $\varphi_1$ is shown and the second curve (the second FSR) for the second phase $\varphi_2$ in keeping with the illustrative examples described above.

For example, suppose the measured phase value of $\varphi_1$ is approximately 0.5 and the measured phase value for $\varphi_2$ approximately 2.5. To more accurately determine the wavelength, the intersections 340, 342 of these phase values with the first and second FSR 301, 302 in an FSR portion 343 of the first and second FSR's that encompass the coarse wavelength of 1545 nm are determined and occur at approximately 1546 nm. As such, the instructions stored in memory 14 cause the processor 12 to recognize the specific FSR portion 343 of the first and second FSR's 301, 302 that includes the coarse wavelength 1545 nm is the correct portion and the intersections 340, 342 based on the calibration data stored in look up table at 184, 185 provide the correct phase value/wavelength pair to more accurately determine the wavelength of the input optical signal 101. By contrast, the instructions stored in memory 14 cause the processor 12 to overlook or ignore portions of the first and second FSR's 301, 302 that do not include the coarse wavelength of 1545 nm are incorrect. So, FSR portions 344 and 345 and all other available FSRs except FSR portion 343 are incorrect FSR portions and the instructions cause the processor to ignore the intersections of the phase values for $\varphi_1$ and $\varphi_2$ of the illustrative examples at their respective intersections with first and second FSR's 301, 302 in these portions of the FSR's.

In another example, suppose the measured phase value of $\varphi_1$ is approximately −2.6 and the measured phase value for $\varphi_2$ approximately 2. To more accurately determine the wavelength, the intersections 347, 348 of these two phase values with the first and second FSR's 301, 302 in an FSR portion 346 of the first and second FSR's that encompass the coarse wavelength of 1555 nm are determined and occur at approximately 1556 nm. As such, the instructions stored in memory 14 cause the processor 12 to recognize the specific FSR portion 346 of the first and second FSR's 301, 302 that includes the coarse wavelength 1555 nm is the correct portion and the intersections 347, 348, based on the calibration data stored in look up table at 184, 185, provide the correct phase value/wavelength pair to more accurately determine the wavelength of the input optical signal 101. By contrast, the instructions stored in memory 14 cause the processor 12 to overlook or ignore portions of the first and second FSR's 301, 302 that do not include the coarse wavelength of 1545 are incorrect. So, for example, FSR portions 343, 344, 345 and all other available FSRs except FSR portion 346 are incorrect FSR portions and the instructions cause the processor to ignore the intersections of the phase values for $\varphi_1$ and $\varphi_2$ of the illustrative examples at their respective intersections with first and second FSR's 301, 302 in these portions of the FSR's.

At 188 and 189, the wavelengths determined based at 186, 187 are provided at 188 and 189, and at 190 are averaged to provide a measured output wavelength 192. As such, the instructions stored in memory 14 cause the processor to average the measured wavelengths based on the first and second phases $\varphi_1$, $\varphi_2$ at 186, 187 to provide the measured output wavelength 192.

Finally, the output photocurrents from the first photodetectors 151~155 and the second photodetectors 161~165 are added at 193 through the execution of instructions by the processor 12 to provide a power measurement 194.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An apparatus for determining an wavelength and a power of an input optical signal, the apparatus comprising:
    a first optical splitter adapted split power of the input optical signal into a first output optical signal and a second output optical signal;

a second optical splitter connected to a first arm of the first optical splitter, and adapted to split the first output optical signal into a third output optical signal and a fourth optical signal;

a third optical splitter connected to a second arm of the first optical splitter, and adapted to split the second output optical signal into a fifth output optical signal and a sixth optical signal;

a first Mach-Zehnder Interferometer (MZI) having a first free spectral range (FSR);

a second Mach-Zehnder Interferometer (MZI) having a second FSR, wherein the first MZI has a first optical path length (OPL) difference, and the second MZI has a second optical path length (OPL) difference, which is greater than the first OPL difference;

a processor; and a memory which stores instructions, which when executed by the processor, cause the processor to: recover a first phase for the first MZI; recover a second phase for the second MZI; subtract the first phase from the second phase to provide a phase difference; determine an unwrapped phase difference as a function of wavelength; determine a coarse wavelength; determine a first wavelength for the first MZI and a second wavelength from the second MZI; and average the first and second wavelengths to determine the wavelength of the input optical signal.

2. The apparatus as claimed of claim 1, wherein the instructions further cause the processor to add power levels from photodetectors to determine the power of the input optical signal.

3. The apparatus of claim 1, wherein the first MZI has a first optical path length (OPL) difference, and the second MZI has a second optical path length (OPL) difference, which is greater than the first OPL difference.

4. The apparatus of claim 1, wherein for each of the first and second FSR's, a unique relationship exists between a phase and a wavelength.

5. The apparatus of claim 1, further comprising a plurality of photodetectors, each photodetector adapted to measure a power of one of a first, a second, a third, a fourth, a fifth, a sixth, a seventh and an eighth optical signal.

6. The apparatus of claim 5, wherein the instructions further cause the processor to determine an inverse tangent of a difference of power levels of a first photodetector and a second photodetector, and of power levels of a difference between a third photodetector and a fourth photodetector to determine the first phase.

7. The apparatus of claim 6, wherein the instructions further cause the processor to determine an inverse tangent of a difference of the power levels between a fifth photodetector and a sixth photodetector, and of a difference of power levels of a seventh photodetector and an eighth photodetector to determine the second phase.

8. The apparatus of claim 1, wherein the memory comprises calibration data comprising the unwrapped phase difference versus wavelength, and the instructions further cause the processor to determine the coarse wavelength based on the calibration data.

9. The apparatus of claim 8, wherein the instructions further cause the processor, based on the coarse wavelength, to determine a first wavelength for the first phase and a second wavelength for the second phase.

10. The apparatus of claim 9, wherein the instructions further cause the processor to determine the wavelength of the input optical signal from an average of the first wavelength and the second wavelength.

11. The apparatus of claim 1, further comprising a first optical hybrid connected to the first MZI and a second optical hybrid connected to the second MZI, wherein a phase relation between adjacent outputs of the first and second optical hybrids is one of 120°, 90°, and 60°.

12. A tangible, non-transitory computer readable medium that stores instructions, which when executed by a processor, cause the processor to:

recover a first phase for a first Mach-Zehnder Interferometer (MZI);

recover a second phase for a second MZI's; subtract the first phase from the second phase to provide a phase difference;

determine an unwrapped phase difference as a function of wavelength;

determine a coarse wavelength;

determine a first wavelength of the first MZI for the first phase and a second wavelength of the second MZI from the second phase; and average the first and second wavelengths to determine the wavelength of an input optical signal.

13. The tangible, non-transitory computer readable medium as claimed of claim 12, wherein the instructions further cause the processor to add power levels from photodetectors to determine a power of an input optical signal.

14. The tangible, non-transitory computer readable medium of claim 12, wherein the first MZI has a first optical path length (OPL) difference, and the second MZI has a second optical path length (OPL) difference, which is greater than the first OPL difference.

15. The tangible, non-transitory computer readable medium of claim 12, wherein for each of the first and second FSR's a unique relationship exists between a phase and a wavelength.

16. The tangible, non-transitory computer readable medium of claim 15, wherein the instructions further cause the processor to determine an inverse tangent of a difference of power levels of a fifth photodetector and a sixth photodetector, and a difference of power levels between a seventh photodetector and an eighth photodetector to determine the second phase.

17. The tangible, non-transitory computer readable medium of claim 12, wherein a memory comprises calibration data comprising the unwrapped phase difference versus wavelength, and the instructions further cause the processor to determine the coarse wavelength from the calibration data.

18. The tangible, non-transitory computer readable medium of claim 17, wherein the instructions cause the processor, based on the coarse wavelength, to determine a first wavelength for the first phase and a second wavelength for the second phase.

19. The tangible, non-transitory computer readable medium of claim 17, wherein the instructions further cause the processor to determine a portion of a free spectral range that includes the coarse wavelength.

20. The tangible, non-transitory computer readable medium of claim 12, wherein the instructions further cause the processor to determine a wavelength of an input optical signal from an average of the first wavelength and the second wavelength.

* * * * *